(12) United States Patent
Powell et al.

(10) Patent No.: US 10,994,640 B2
(45) Date of Patent: May 4, 2021

(54) COVER ASSEMBLY FOR VEHICLE ARMREST

(71) Applicant: GRAMMER AG, Ursensollen (DE)

(72) Inventors: James Powell, Sterling Heights, MI (US); Joe Cahill, Troy, MI (US); Aaron Cubells, Detroit, MI (US); Gary Kosnik, Milford, MI (US); Don Kromm, Lake Orion, MI (US)

(73) Assignee: GRAMMER AG, Ursensollen (DE)

( * ) Notice: Subject to any disclaimer, the term of this patent is extended or adjusted under 35 U.S.C. 154(b) by 0 days.

(21) Appl. No.: 16/369,931

(22) Filed: Mar. 29, 2019

(65) Prior Publication Data

US 2019/0337433 A1 Nov. 7, 2019

(30) Foreign Application Priority Data

May 4, 2018 (DE) .................. 10 2018 110 819.2

(51) Int. Cl.
*B60N 2/75* (2018.01)
*B60N 3/10* (2006.01)

(52) U.S. Cl.
CPC ............ *B60N 2/773* (2018.02); *B60N 2/767* (2018.02); *B60N 2/777* (2018.02); *B60N 2/793* (2018.02); *B60N 3/101* (2013.01)

(58) Field of Classification Search
CPC . B60N 2/753; B60N 2/75; B60N 2/79; B60N 2/777; B60N 2/773; B60N 2/767; B60N 2/793; B60N 3/101; B60N 3/10
USPC .................... 297/411.32, 411.2, 440.14
See application file for complete search history.

(56) References Cited

U.S. PATENT DOCUMENTS

| | | | | |
|---|---|---|---|---|
| 4,953,259 A | * | 9/1990 | Frye | E05D 11/06 16/225 |
| 5,611,977 A | * | 3/1997 | Takei | B60N 2/75 264/46.5 |
| 9,145,075 B2 | * | 9/2015 | Andersson | B60N 3/101 |

* cited by examiner

*Primary Examiner* — Milton Nelson, Jr.
(74) *Attorney, Agent, or Firm* — Andrew Wilford

(57) ABSTRACT

Arm support (12) for an armrest (10), comprising a frame (19) that comprises connectors for the fixed or moveable attachment to a structure, in particular to a structure of a vehicle, wherein the frame comprises longitudinal bars (23, 24) and cross bars (21, 22) that are connected to one another with connectors (25, 26, 27, 28).
The particularity is that at least a first type of connector is provided that is connectable with at least one longitudinal bar (23, 24) selected from a set of longitudinal bars of different length, and/or with at least one cross bar (21, 22) selected from a set of cross bars of different length.

9 Claims, 10 Drawing Sheets

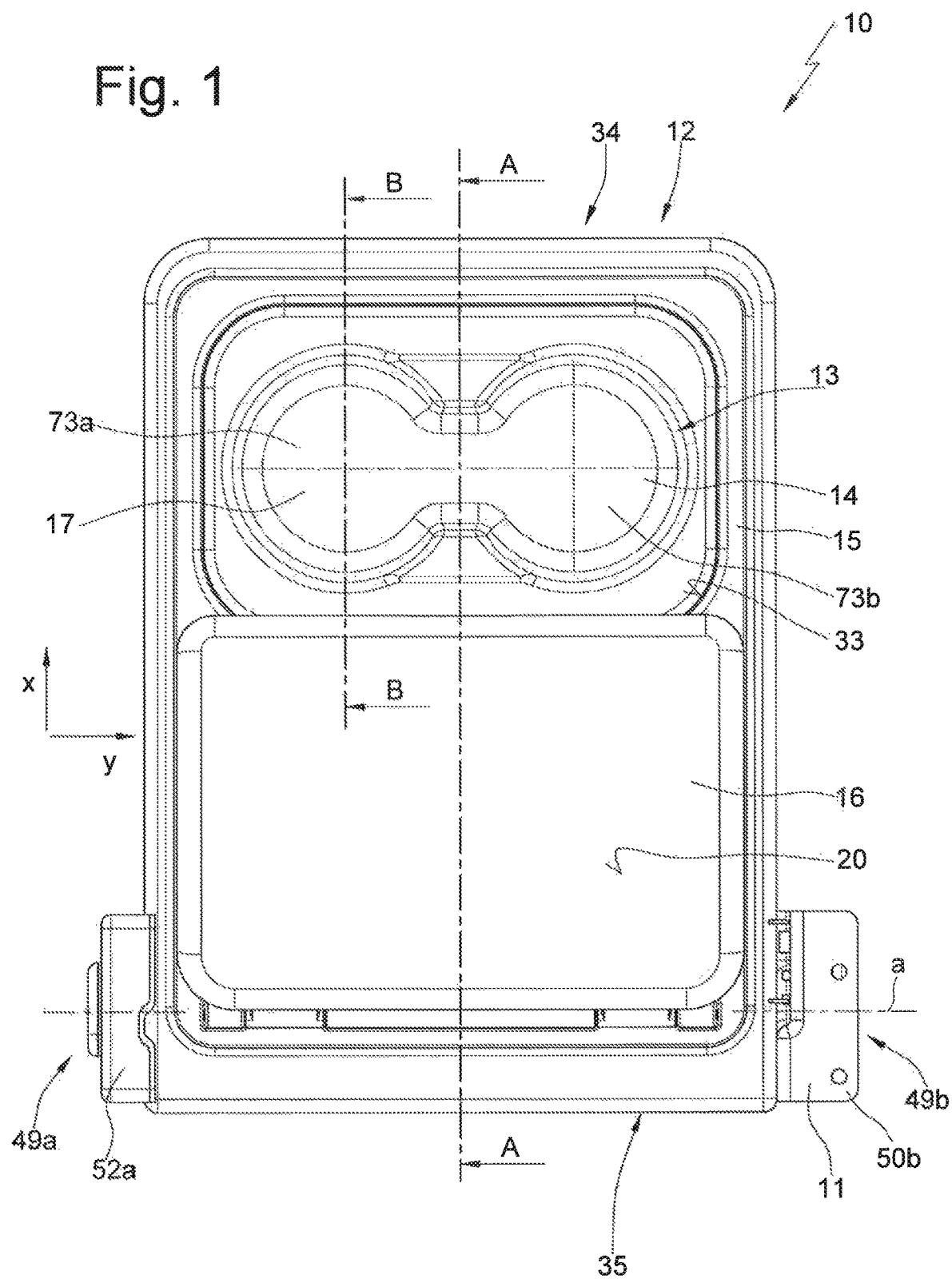

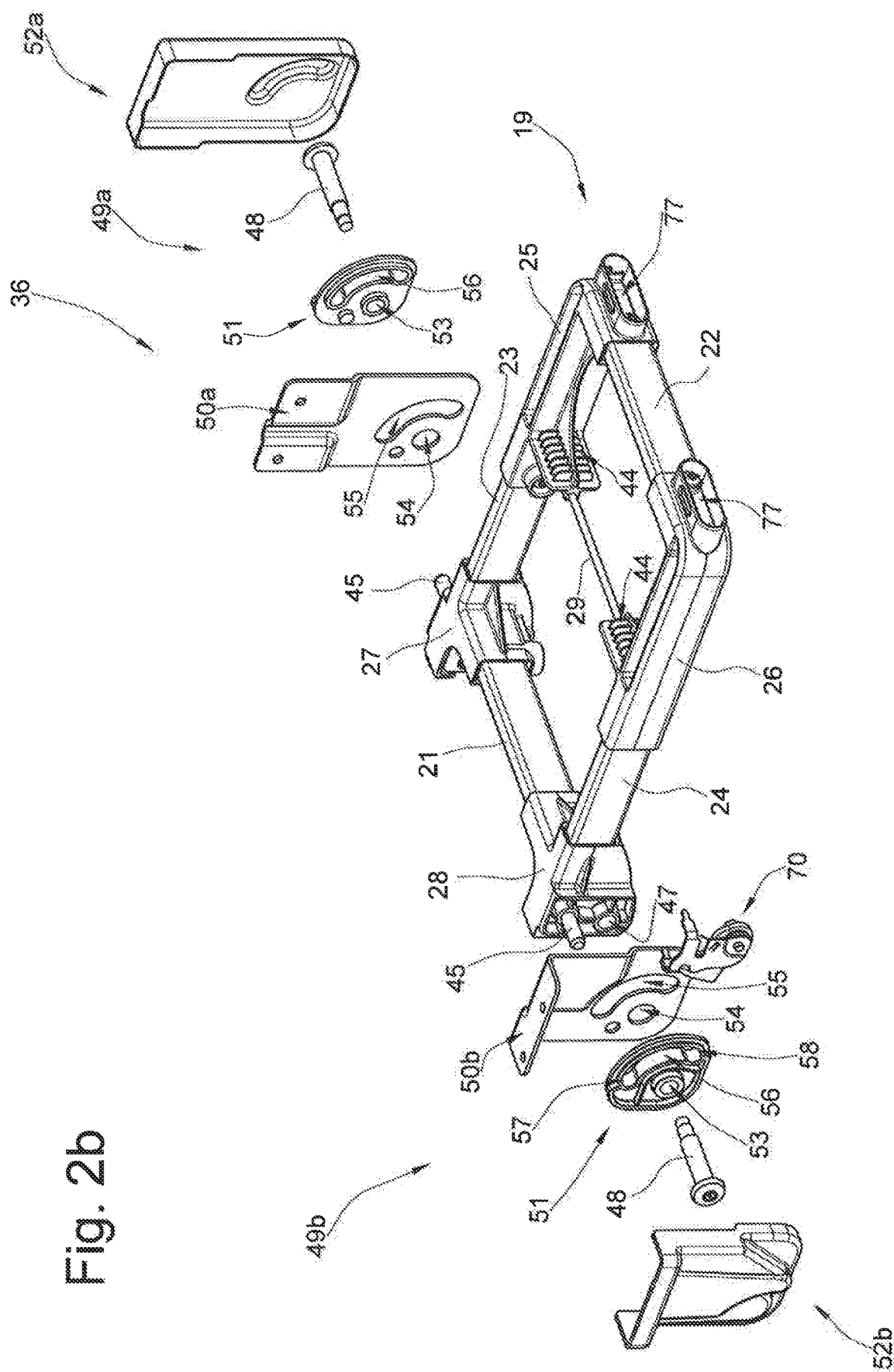

COVER ASSEMBLY FOR VEHICLE ARMREST

FIELD OF THE INVENTION

The invention relates to an arm support for an armrest, and in particular to an armrest of a vehicle.

BACKGROUND OF THE INVENTION

Such an arm support is well known from the prior art. The arm support comprises a base body made of plastic material, in which a cup holder and a storage compartment are formed, as required. The base body is moveably or fixedly mounted on the vehicle structure. The storage compartment can be closed by a cover. In addition, the base body is provided with a cushion.

OBJECT OF THE INVENTION

The object of the invention is to provide an arm support that is constructed in such a way that it can be easily adapted to different applications in that its size is variable and in that it can be selectively equipped with a cup holder and/or a storage compartment and/or a cover.

SUMMARY OF THE INVENTION

This object is attained in that the arm support comprises a frame that is fixedly or moveably mounted on a structure fixed in the vehicle, for example. The frame can be pivotable on the structure, for example. The frame comprises longitudinal bars and cross bars that are connected to one another by connectors. The frame comprises at least a first type of connector that is connectable with at least one longitudinal bar from a set of longitudinal bars of different length, and/or with at least one cross bar selected from a set of cross bars of different length.

In this way, arm supports of different length, but the same width, can be obtained just by exchanging the longitudinal bars. By exchanging only the cross bars, arm supports of the same length, but different width, can be produced. Furthermore, the length and width dimensions can be changed by replacing the longitudinal and the cross bars. The longitudinal and the cross bars from the respective sets of cross bars and longitudinal bars can be freely combined.

In this way, arm supports of different length and width dimensions can be produced, with the remaining parts of the arm support substantially remaining unchanged. As a result, fewer parts must be held available.

At least one insert can be attached to the frame, for example. The insert may comprise a support surface and/or at least one cup holder and/or at least one storage compartment, for example.

Further according to a second aspect of the invention, the arm support for an armrest comprises a frame that comprises connectors for the fixed or moveable attachment to a structure, in particular to the structure of a vehicle, in accordance with the first aspect of the invention. In this case, the frame comprises longitudinal bars and cross bars that are connected to one another by connectors as described above.

At least one insert is attachable in the frame. The frame comprises at least one structure that is releasably engaged with at least one counter structure of the insert, and the structure and the counter structure can be brought into engagement in different relative positions, and form an adapter for the attachment of the insert to the frame, independently of the shape, i.e. the length and width dimensions of the frame.

For example, the structure comprises a plurality of vanes, and the counter structure comprises at least one vane. Alternatively, the structure comprises at least one vane and the counter structure comprises a plurality of parallel spaced vanes. The vanes of the structure can be brought into engagement with the vanes of the counter structure in different relative positions, in that the vanes of the structure and the vanes of the counter structure are nested, or, in other words, each vane of the counter structure fit in a space between two vanes of the structure, and is held thereby.

By the engagement of the structure and the counter structure, different relative positions between the frame and the insert can be adjusted and set. When the structure is engaged with the counter structure, the insert can no longer move in the set direction relative to the frame. In this way, an insert can be reliably held in position despite different lengths of the frame in the X direction and/or Y direction.

The following embodiments relate to the first aspect of the invention as well as to the second aspect of the invention. According to one embodiment, the connector is provided with at least two sockets, and one bar can be inserted into each socket. The sockets can be configured to receive a certain cross-sectional shape of a bar, or alternatively or additionally be configured in such a way that a first socket is configured to receive a first cross-sectional shape and at least one second socket is configured to receive a second cross-sectional shape of a bar. In a simple configuration, all longitudinal bars and cross bars have the same cross-sectional shape and the sockets of all connectors are correspondingly configured to receive a certain cross-sectional shape. For example, two or three sockets are formed at the connectors. However, multiple sockets can be formed on a connector.

According to one embodiment, at least one connector is formed with an axle extension, or with a seat for mounting an axle element. In the case that the arm support is held pivotably on a vehicle structure, means that define a pivot axis, are required. To that end, first axle elements must be provided on the arm support, and second axle elements that are on the vehicle structure. For example, the first axle elements include a trunnion, the central longitudinal axis of which is for example transverse to the longitudinal direction of the arm support. For example, a seat for the attachment of the axle elements can be formed on at least one type of connector. Recesses for the reception of the trunnion are formed on the connector, for example. Alternatively, the trunnion can be molded on the connector. Alternatively, the trunnion can also be molded or fastened to the vehicle structure.

According to one embodiment, at least one insert can be fastened to the frame. The insert can be formed by a cup holder, a storage compartment, or by a placeholder, for example that at least partially defines the shape of the outer surface of the arm support.

The size of at least one insert is constant, for example. In this way, less parts must be held available.

The insert is mountable on the frame for example by an adapter, independently from the longitudinal and transverse dimensions of the frame, wherein the frame, in particular the connector, comprises a structure that can be brought into engagement with a counter structure of the insert.

For example, at least one insert comprises a collar that is provided with support surfaces that cooperate with counter surfaces of the frame.

Alternatively or additionally, the adapter comprises at least one bar or a wall that can be brought into engagement with a vanes structure, including multiple walls. The walls of the vanes structure are parallel to one another, for example. In this embodiment, the bar can widen against the insertion direction in a V-shaped manner, for example. According to an alternative, the walls can be configured in such a way that the spaces between the walls get narrower in the insertion direction, in a V-shaped manner. The insert comprises the bar, for example, and the frame comprises the vanes structure. According to an alternative, or additionally, the insert comprises the vanes structure and the frame comprises the bar.

The arm support comprises for example a latch for the locking of the insert to the frame that comprises first latch elements on the insert, and second latch elements on the frame. The insert can be directly or indirectly fastened to the frame using the latch.

Furthermore, the invention relates to an armrest for a seat, in particular for a vehicle seat. The armrest comprises a fixed structure, such as a holder. The arm support is moveably, in particular pivotably, or fixedly mounted on the fixed structure. The arm support is an arm support according to the first aspect of the invention. Regarding the advantages—to avoid repetitions—reference is made to the first aspect of the invention.

BRIEF DESCRIPTION OF THE DRAWING

Further advantages result from the description of an embodiment schematically shown in the Figures. The Figures show in:

FIG. 1 a plan view of the armrest in the use position,

FIG. 2b an illustration of a detail within dot-dash line F in FIG. 2a,

SPECIFIC DESCRIPTION OF THE INVENTION

Figure 2A:
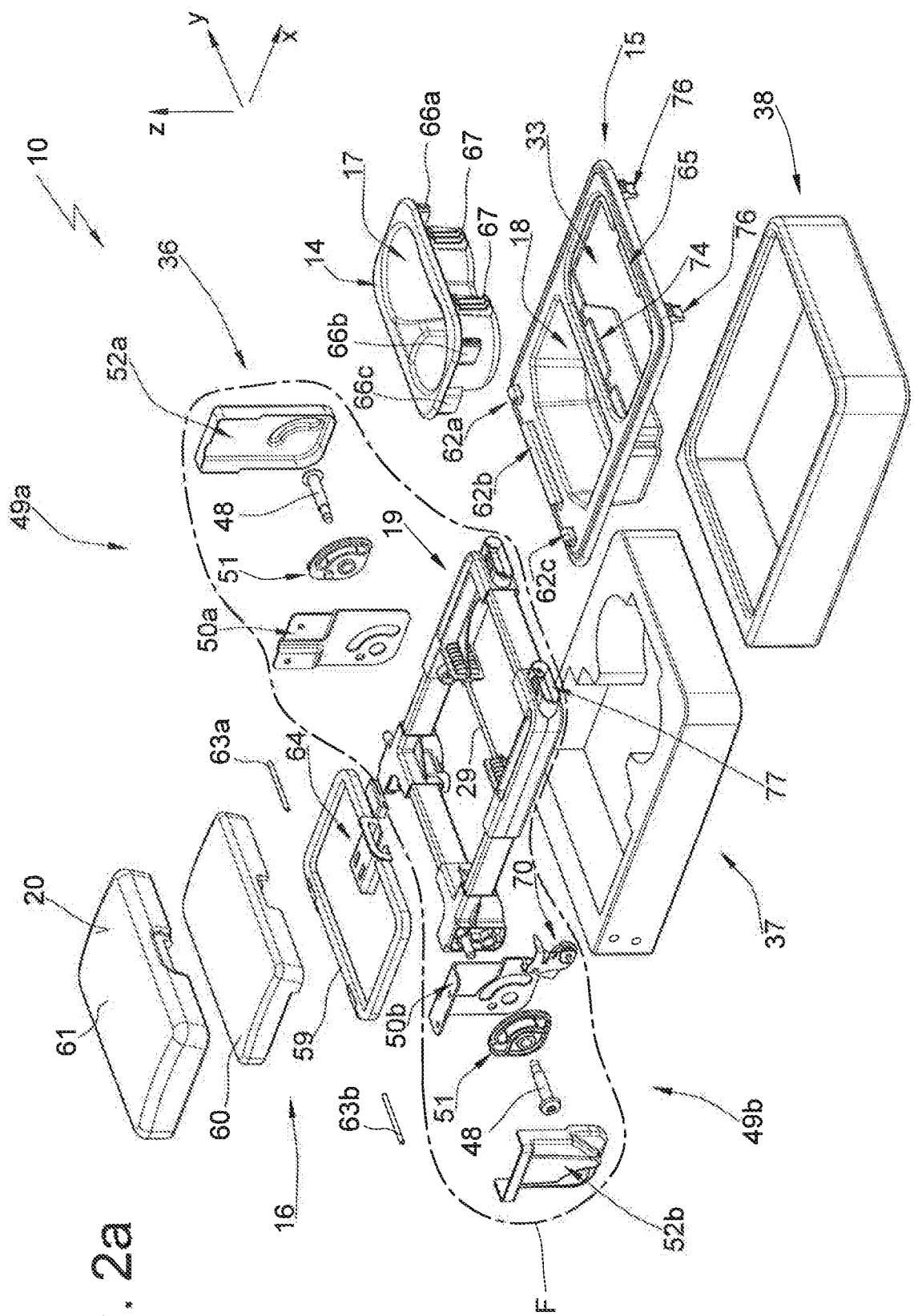
FIG. 2a an exploded view of the armrest.

The armrest is generally indicated with reference character 10 throughout the drawings. Like reference characters in different Figures relate to corresponding features, even though no small letters are added or omitted.

FIG. 1 is a plan view of the armrest 10. It comprises a base 11, of which only bearing assemblies 49a and 49b are shown in FIG. 1. The base 11 is a fixed structure that is stationary or for example fixed on a vehicle. Furthermore, an arm support 12 is included that is pivotable around a pivot axis a on the base 11. The arm support 12 is provided with a receptacle 13 that in the present embodiment holds inserts 14 and 15. A storage compartment is for example formed in the insert 15, but it is not discernable in FIG. 1 since it is under a cover 16. The cover 16 forms an arm support surface 20. Furthermore, a front aperture 33 is formed in the insert 15 that is covered by the insert 14, and the insert 14 fits in the front aperture 33 and engages over an edge 74 (FIG. 2a) of the front aperture 33.

A recess 17 is formed in the insert 14 that forms two cup holders 73a and 73b for beverage containers. The recess 17 is at a free outer end 34 of the arm support 12. The arm support 12 is mounted on the base 11 at an inner end 35 of the arm support 12 opposite the free end 34.

In the exploded view of FIGS. 2a and 2b, the armrest 10 is shown to comprise a frame 19, the inserts 14 and 15, a mount 36 with the bearing assemblies 49a and 49b, the cover 16 as well as a foam body 37 and an outer cover 38.

Figure 3:
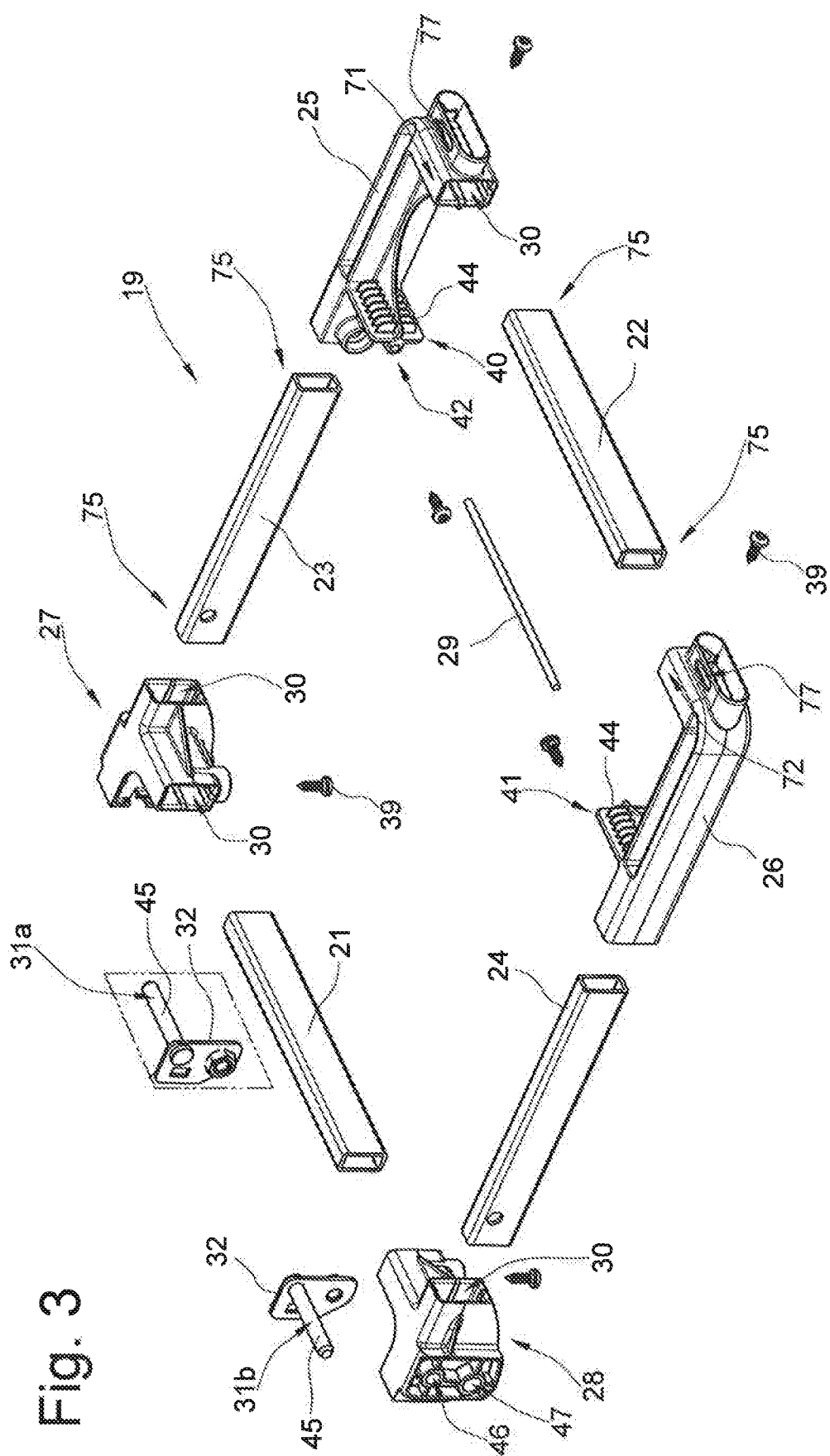
FIG. 3 an exploded view of a frame of the armrest.

FIG. 3 shows an exploded view of the frame 19. The frame 19 comprises transverse bars 21 and 22 and longitudinal bars 23 and 24. The transverse bars 21, 22 are selected from a first set of bars of different lengths. The longitudinal bars 23 and 24 are selected from a second set of bars of different bar lengths. The bar 22 is fastened to front connectors 25 and 26 and the bar 21 is fastened to rear connectors 27 and 28. The bar 23 is fastened to the connectors 25 and 27 and the bar 24 is fastened to the connectors 26 and 28.

In the present embodiment, the attachment occurs in that a screw 39 is inserted through an opening of the respective connector 25, 26, 27 or 28 and screwed into the bar 21, 22, 23, or 24. Alternatively, any other conceivable form-fitting, force-fitting or material-bond attachment can be used.

As an alternative to the illustrated configuration, at least one pair of the bar pairs 21 and 22/23 and 24 could have a different length. The connectors 25, 26, 27 and 28 are always configured the same for all sizes of the frame 19. In this way, arm supports 12 of different size can be produced with few parts, and that differ from one another in terms of their length dimensions and/or in terms of their width dimensions.

The connectors 25, 26, 27 and 28 are each provided with two sockets 30 into which ends 75 of the bars 21, 22, 23, 24 can be inserted. The sockets 30 of each connector 25, 26, 27 and 28 are formed at an angle of 90° relative to one another. If the end 75 is fitted into the socket 30, it is held in its position relative to the socket 30 by the respective screw 39 and prevented from moving out of the socket 30.

The connector 25 is formed with a projection 40, and the connector 26 with a projection 41. The projections 40 and 41 are provided to hold and stabilize the inserts 14 and 15. The projections 40 and 41 each include a respective rod seat 42 that receives a rod 29 in the finally assembled frame 19. Moreover, a structure 44 that comprises multiple spaced, rigid vanes 43 extending in the Z direction is formed on each projection 40, 41.

Similarly a respective such structure 44 is formed on a region 71 of the connector 25 (see for example FIG. 8) and a region 72 of the connectors 26. The structure 44 of the projection 40 and the structure 44 of the region 71 face oppositely toward one another across the front aperture 33. In the same way, the structure 44 of the projection 41 and the structure 44 of the region 72 oppositely face each other across the front aperture 33.

Figure 7:
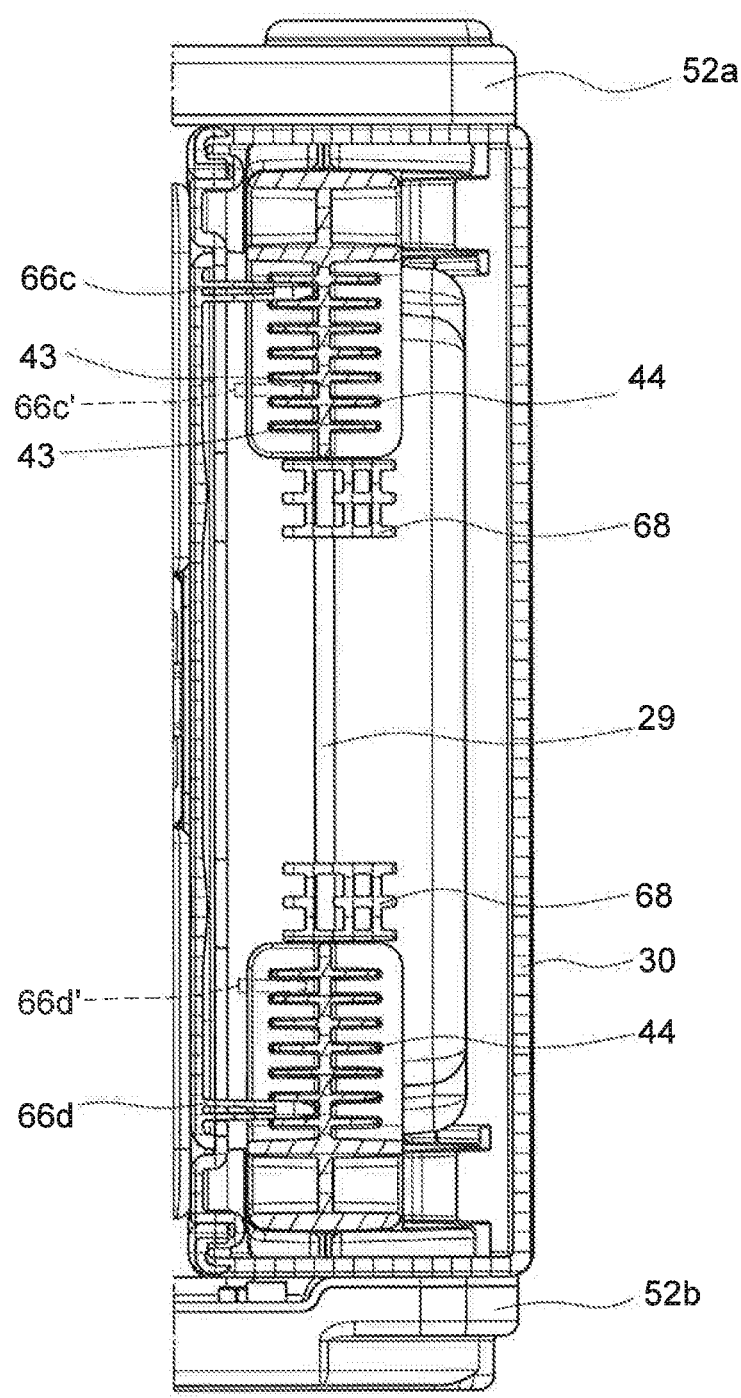
Figure 8:
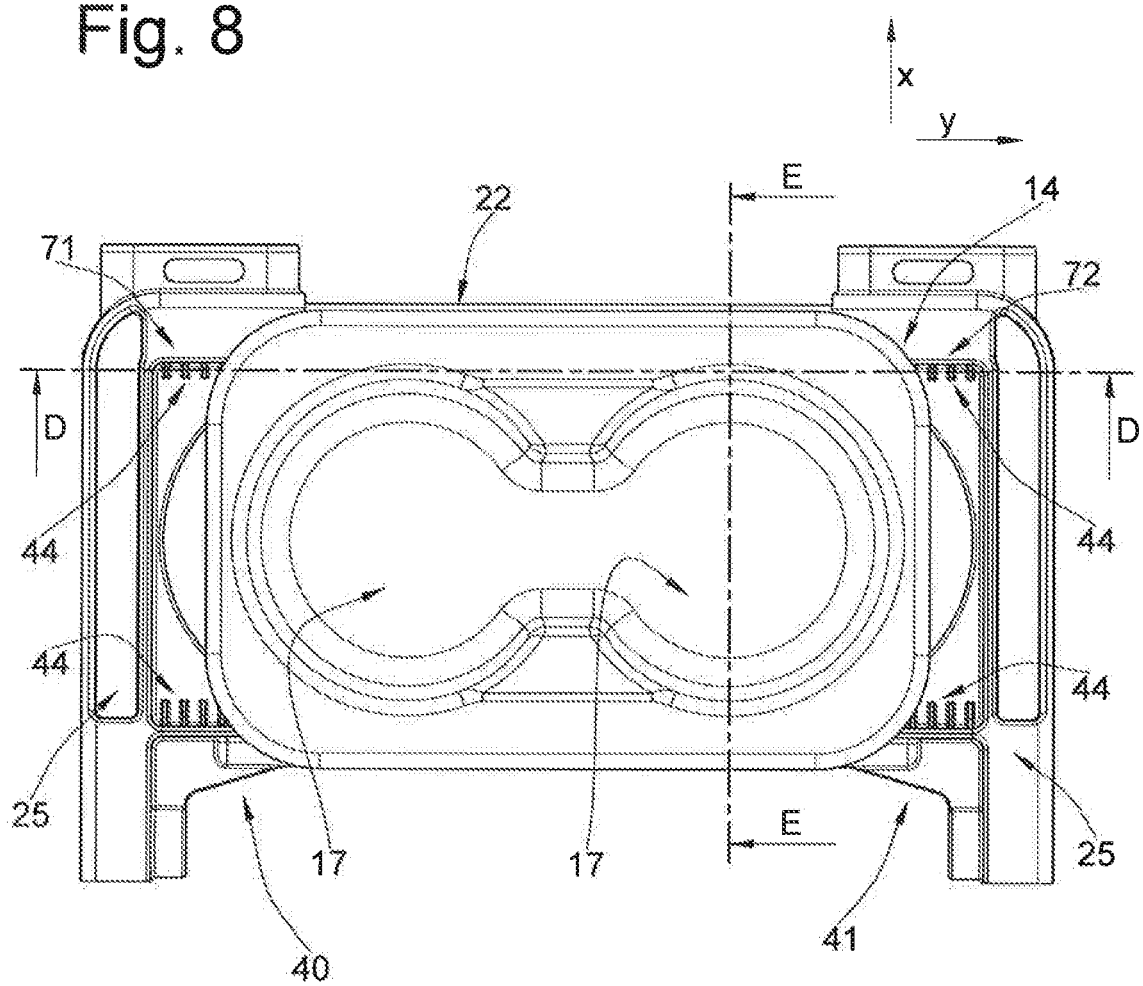
Figure 9:
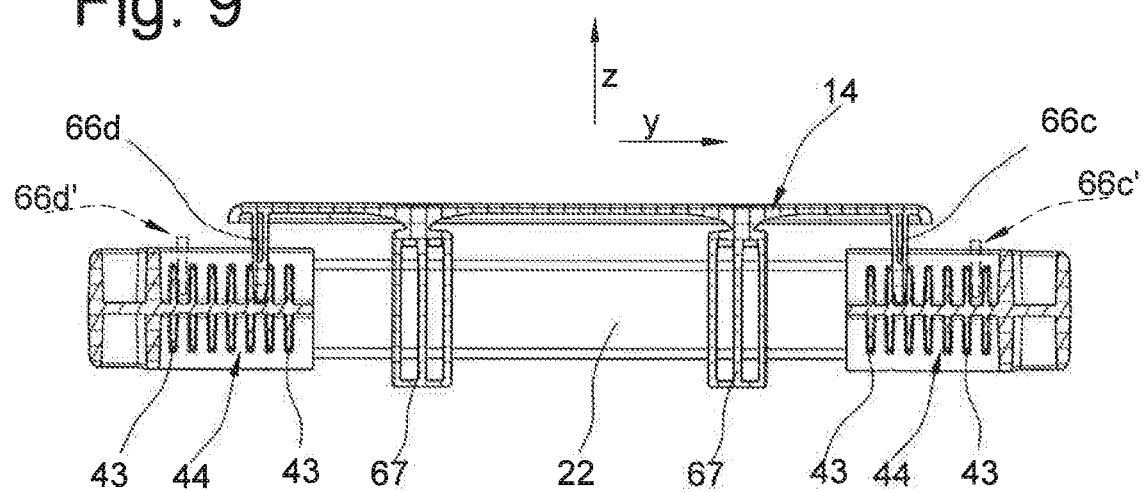
Figure 10:
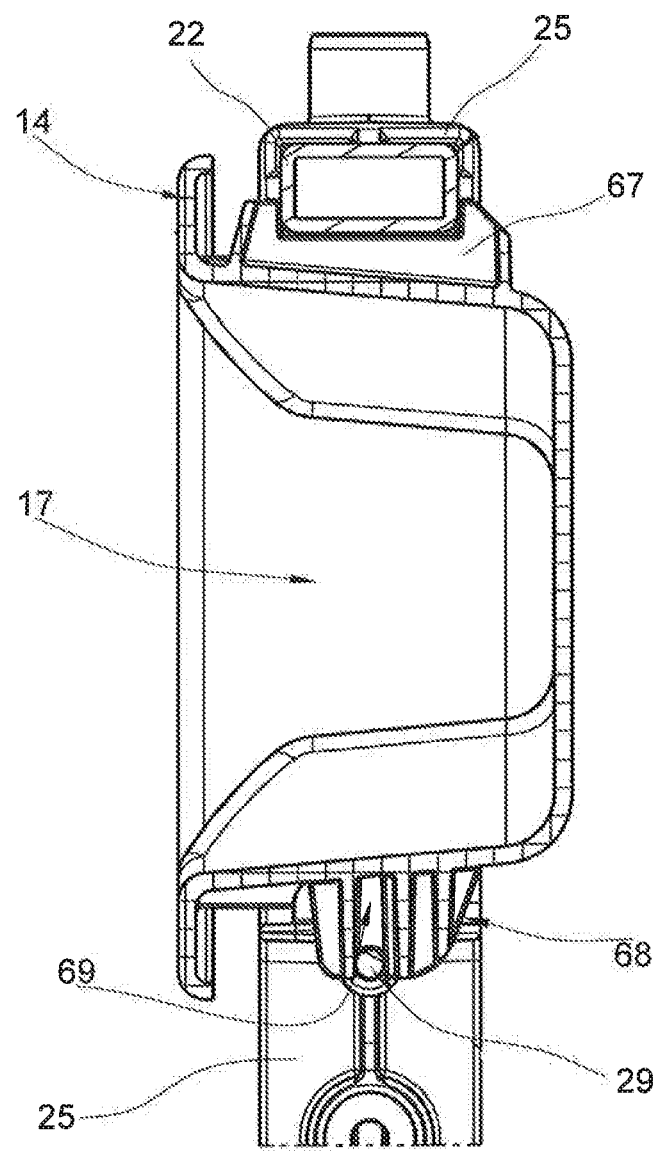

FIGS. 2a and 2b as well FIGS. 7 to 9 show that the insert 14 is provided with four complementary counter structures 66a, 66b, 66c, and 66d that in the present embodiment are formed in the shape of a vertical rib. Each counter structure 66c and 66d engages between two vanes 43 of the respective structure 44, according to FIG. 9, and thus positions the insert 14 in relation to the transverse direction y. The counter structures 66a to 66d can be engaged with and released from the respective structures 44 in this way by movement in the direction of the Z-axis of FIG. 9.

A seat for a stop element 31a is formed in the connector 27 (see FIG. 3), and a seat for a stop element 31b is formed in the connector 28. Each stop element 31a and 31b includes a flange 32 as well as a pin 45 protruding from the flange 32. The stop elements 31a and 31b are mirror-symmetrical. In the mounted state, the pin 45 of the stop element 31a engages through a hole 46 (not discernable in FIG. 3) in the connector 27, and the pin 45 of the stop element 31b engages through a hole 46 in the connector 28, and projects laterally outwardly. The stop elements 31a and 31b form part of the mount 36.

Moreover, a pivot hole 47 for an axle pin 48 is formed at the connector 28 as shown for example in FIG. 2. In the same way, a pivot hole 47 for an axle pin 48 is formed at the connector 27.

According to FIG. 2b, the mount 36 comprises the bearing assemblies 49a, 49b at both sides of the arm support 12. Each of the bearing assemblies 49a and 49b includes a motion link part 50a or 50b that in the embodiment is formed of sheet metal, a guide 51, the axle pin 48 as well as a cover 52a or 52b.

The axle pin 48 engages through hole 53 of the guide 51 as well as a hole 54 of the motion link part 50a or 50b and engages in the pivot hole 47 of the respective connector 27 or 28. The axle pin 48 and the pivot hole 47 define the pivot axis a in this way.

The pin 45 is eccentric with respect to the pivot hole 47 and engages through a slot 55 in the motion link part 50a or 50b, as well as a slot 56 in the guide 51. The slots 55 and 56 form a motion link that determines the maximal angular movement of the arm support 12. The slot 55 determines the maximal angular movement of the arm support 12 of the armrest 10. The motion link part 50a or 50b is formed the same in all armrest variants. The slot 56 formed in the guide 51 determines the end positions of the pivot path of the arm support of the respective variant of the armrest 10. The guide 51 is selected from a set of different guides 51 for the respective armrest variant, in which the pivot angle is different by the length and position of the slot 56 relative to fasteners that serve to fasten the guide 51 to the motion link part. The end positions of the arm support 12 result from abutment of the pin 45 on a first end 57 and a second end 58 of the slot 56. The cover 52 prevents contact with the moveable parts of the respective bearing arrangement 49a and 49b and forms a face plate that shields the view on to the parts 45, 48, 50 and 51 of the bearing arrangement.

The cover 16 includes a cover base 59, a foam cushion part 60 and a cover shell 61. The foam part 60 and the cover base 59 are inserted in and attached to the cover shell 61, for example bonded or screwed, so that the parts 59, 60 and 61 form a structural unit.

The insert 15 comprises projections 62a, 62b, and 62c that each have one bore, and the bores of the projections 62a, 62b, and 62c are aligned with one another. Unillustrated such projections having bores are also formed on the cover base 59. In order to be pivotable, the pivot pin 63a is inserted through the bore of the projection 62a, through a projection of the cover base 59, and into the bore 62b. In the same way, the pivot pin 63b is inserted through the bore of the projection 62c, through a second projection of the cover base 59, and into the bore 62b.

A mass inertia latch 70 is shown in FIG. 2 that in a strong acceleration of the arm support 12 prevents further movement of the arm support 12.

The cover base 59 comprises first latch elements 64 that can be releasably engaged with second latch elements 65 of the insert 15, in order to lock or release the cover 16 so that the recess 18 can be blocked in the closed position. After release, the cover 16 can be pivoted in the direction $w_1$ into an open position not illustrated in the drawing. The cover 16 according to FIG. 4 can be pivoted from the open position in the direction $w_2$ to a closed position.

Figure 4:
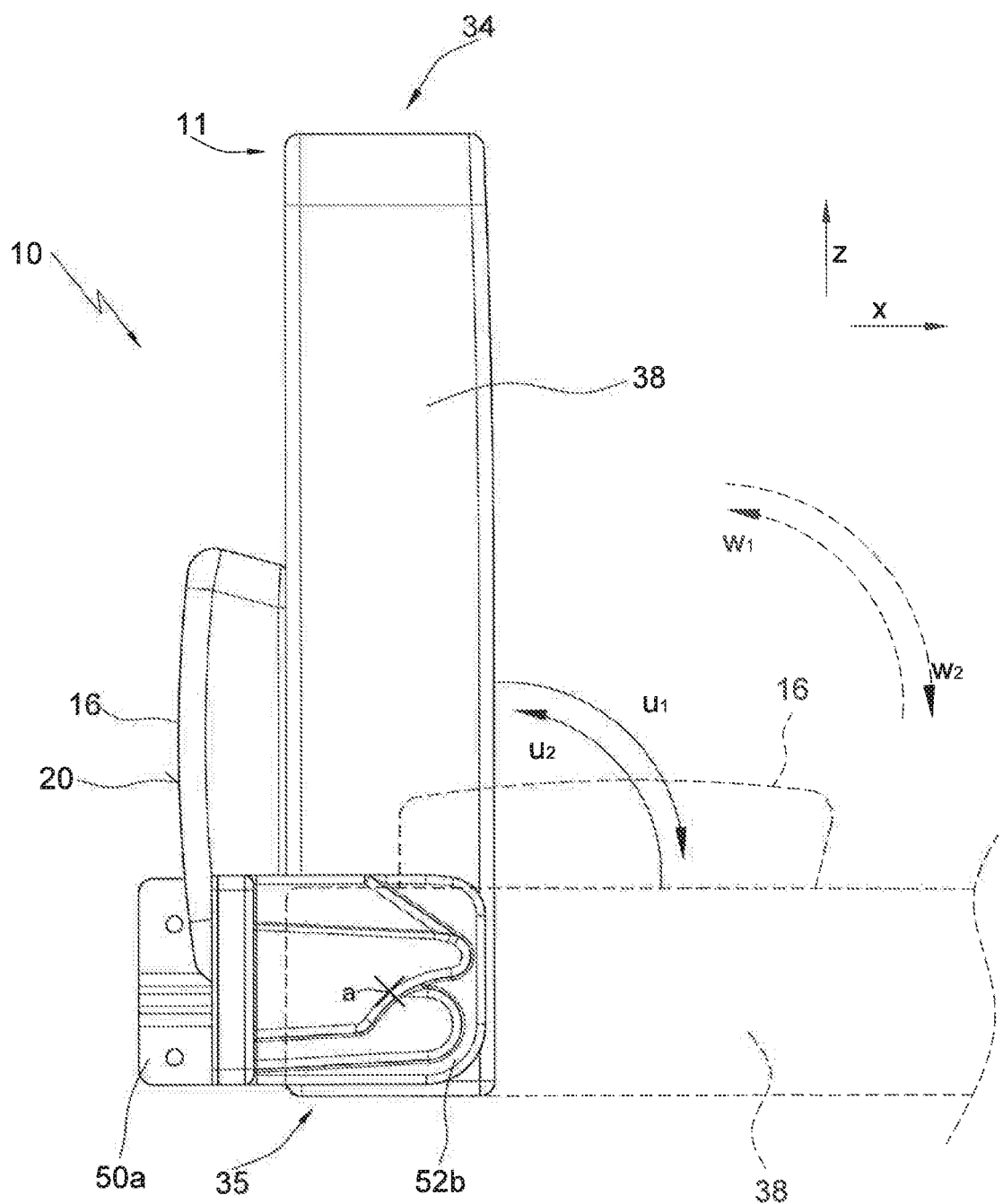
FIG. 4 a side view of the armrest in a nonuse position, where the use position is indicated, FIG. 5 a sectional view of the armrest according to the section line A-A in FIG. 1, with the armrest in the nonuse position represented in FIG. 2, FIG. 6 a sectional view according to the sectional line B-B in FIG. 1, FIG. 7 a sectional view according to the sectional line C-C in FIG. 6, FIG. 8 a plan view of an end of the armrest with only a part of the frame and a cup holder shown, FIG. 9 a sectional view according to the sectional line D-D in FIG. 8, and FIG. 10 a sectional view according to the sectional line E-E in FIG. 8.
Figure 5:
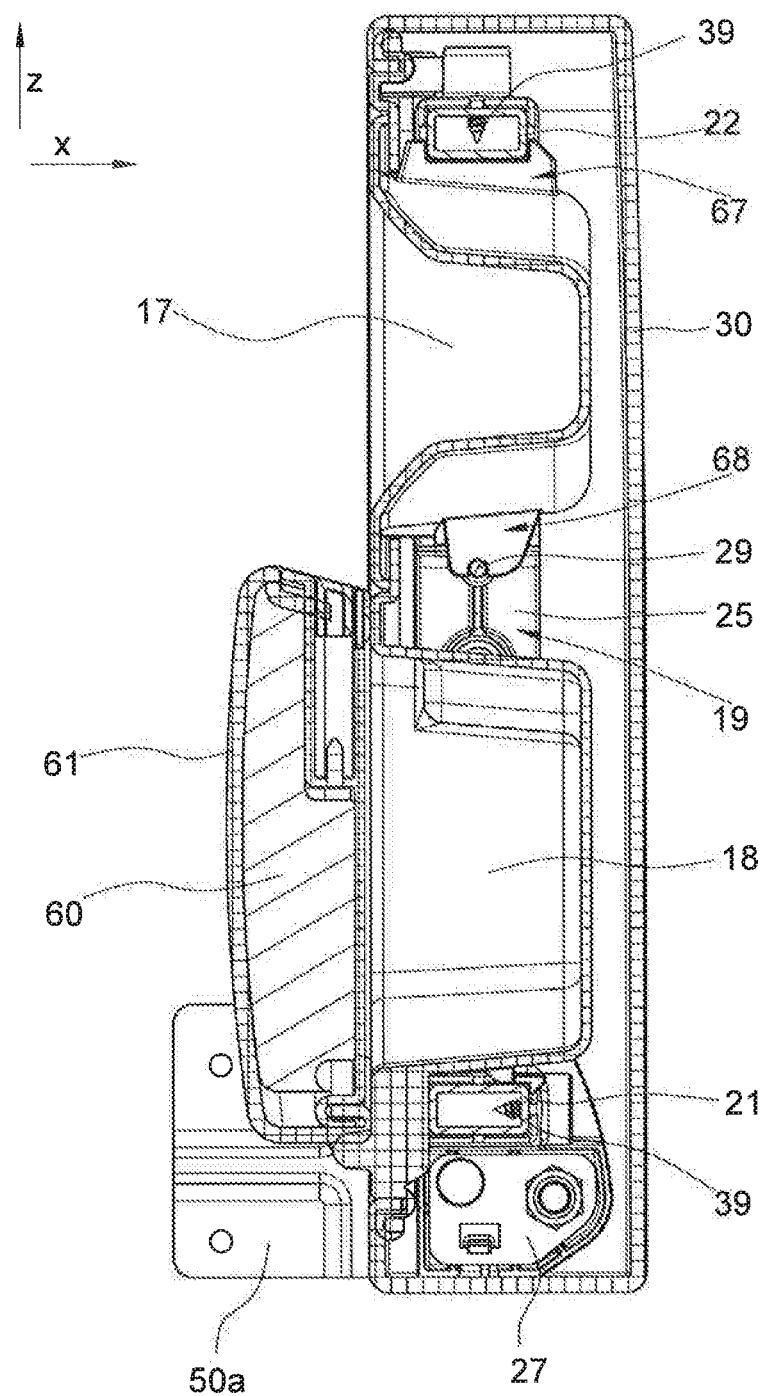
Figure 6:
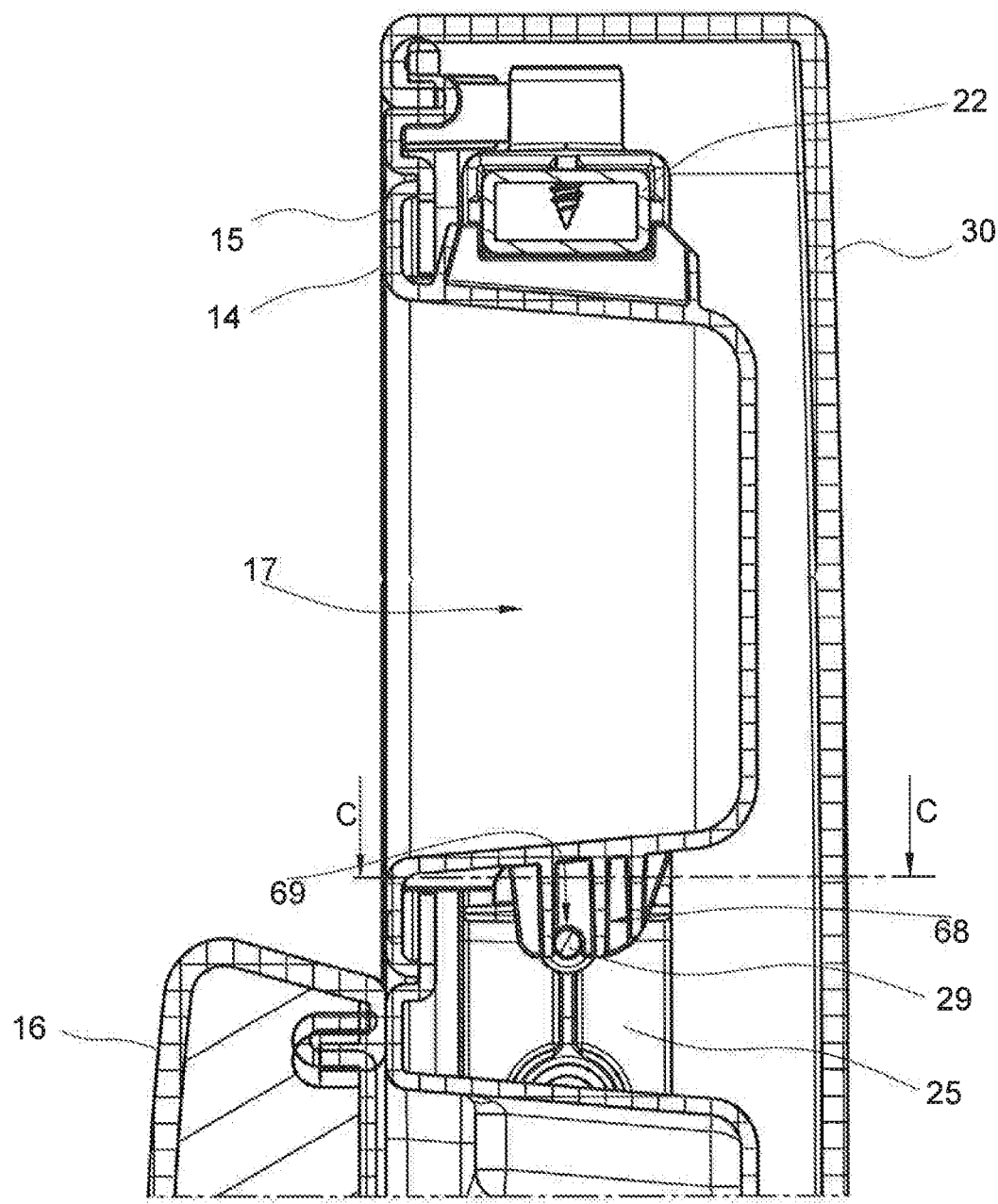

FIG. 4 also shows that the arm support 12 is pivotable relative to the bearing assemblies 49a and 49b in the directions $u_1$ and $u_2$.

The installation of the armrest 10 occurs as follows. After selection of the bars 21, 22, 23 and 24 of the desired size from the set of bars, the bars are mounted on the connectors 25, 26, 27 and 28 and fastened to one another with screws 39. In this case, if required, the rod 29 is also mounted. The rod 14 could for example also be omitted if the armrest is not to comprise an insert 14.

The cover 16, pre-assembled as described above, is attached to the insert 15.

Subsequently, the inserts 15 and 14 are mounted on the frame 19, where first the insert 15 that comprises structures corresponding to the unillustrated structures 67 is brought into engagement with the bar 21. Subsequently, latch projections 76 are brought into engagement and latched with latch sockets 77.

The insert 14 is mounted in that the c-shaped holding structures 67 of the insert 14 are brought into engagement with the bar 22, and a holding structure 68 is latched with the rod 29, so that the rod 29 is in a recess 69 of the holding structure 68.

To fix the insert with respect to the Y-direction to the frame 19, each counter structure 66a, 66b, 66c and 66d is brought into engagement with a respective one of the structures 44, and the insert is arranged between two vanes 43 in such a way that it is fixed in respect of its Y-orientation centrally between the connectors 25 and 26 (see FIGS. 8 and 9).

In an alternative configuration of the frame 19, in which the bars 21 and 22 have the smaller width, the counter structures 66c and 66d would have a position in the structures 44 that is indicated with 66c' and 66d'.

After that, the foam body 37 and the cover 38 are mounted. The finally mounted arm support 12 is then fastened with the mount 36 to the base 11 of the vehicle.

The invention claimed is:

1. An arm support for an armrest, the arm support comprising;
a frame attachable to a vehicle and formed by
longitudinal bars;
cross bars; and
four longitudinally and transversely spaced connectors connecting ends of the bars to one another, at least one of the longitudinal bars being selected from a set of longitudinal bars of different lengths or at least one of the transverse bars being selected from a set of transverse bars of different length
at least one insert attachable in the frame;
two first structures each on a respective one of two of the connectors that are spaced from each other; and
two second spaced counter structures on the insert and each releasably engageable with a respective one of the first structures of the connectors in different relative positions and forming therewith an adapter for attachment of the insert to the frame independently from a dimension of the frame, one of each of the first structure and the second counter structures being formed by a plurality of parallel spaced vanes and another of the first structures and second counter structures being formed by at least one vane fittable between the vanes of the one structure and fittable between different lateral vanes depending on size of the bars.

2. The arm support according to claim 1, wherein the connectors are each provided with two sockets, a respective one of the longitudinal bars being fittable into one of the sockets of each connector and a respective one of the cross bars being fittable into the other of the sockets of each connector.

3. The arm support according to claim 1, wherein two of the connectors that are spaced are each formed with an axle extension or with a seat for mounting an axle element.

4. The arm support according to claim 1, further comprising:
   a latch for locking the insert to the frame and that comprises first latch elements of the insert and second latch elements of the frame.

5. The arm support according to claim 1, wherein the insert comprises at least one storage compartment that can be closed by a cover.

6. An armrest comprising an arm support according to claim 1.

7. The armrest according to claim 6, wherein the frame is pivotable on a base and comprises a device for limiting angular movement that includes first limitation elements on the frame and second limitation elements on the base.

8. The armrest according to claim 7, wherein one of the limitation elements is formed by a pin, and the other of the limitation elements is formed by a motion link device, movement of the pin being limited by ends of the motion link device, the motion link device comprising a motion link part on which a seat is formed for the attachment of a guide that defines the ends.

9. The armrest according to claim 8, wherein the guide is selectable from a set of different guides and attachable to the motion link part.

* * * * *